UNITED STATES PATENT OFFICE.

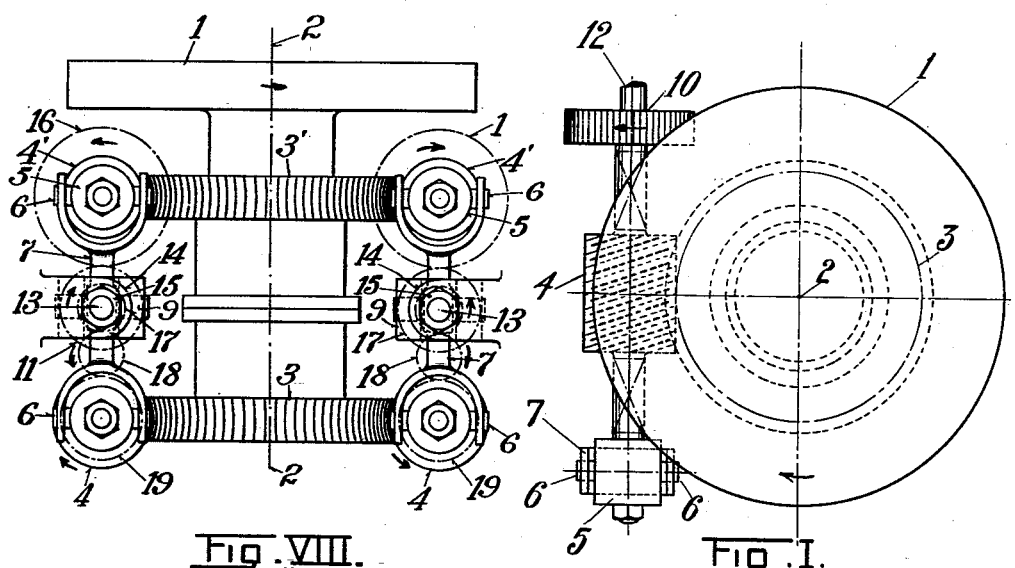
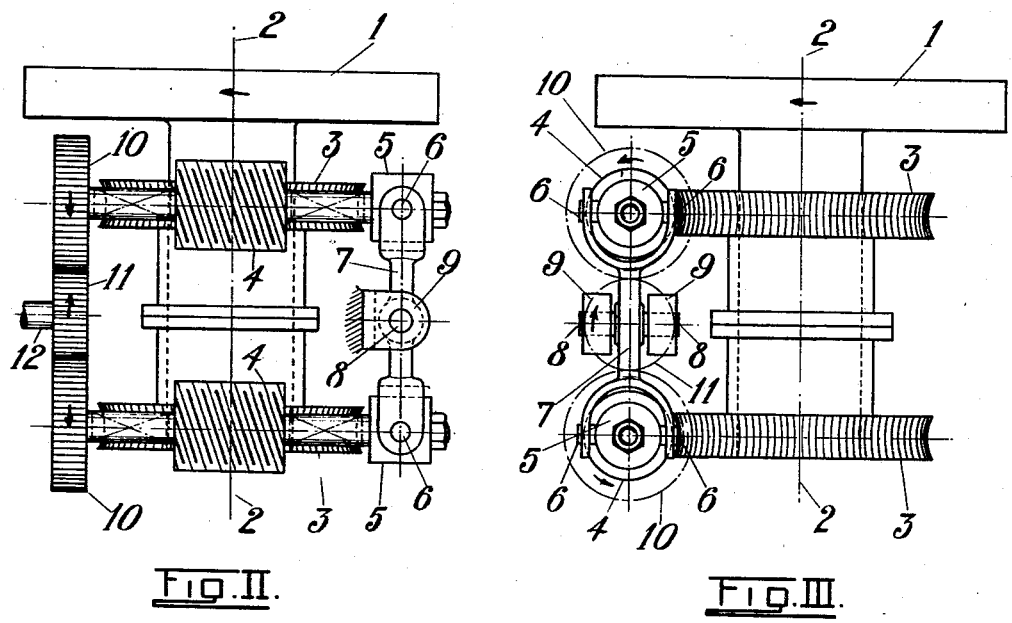

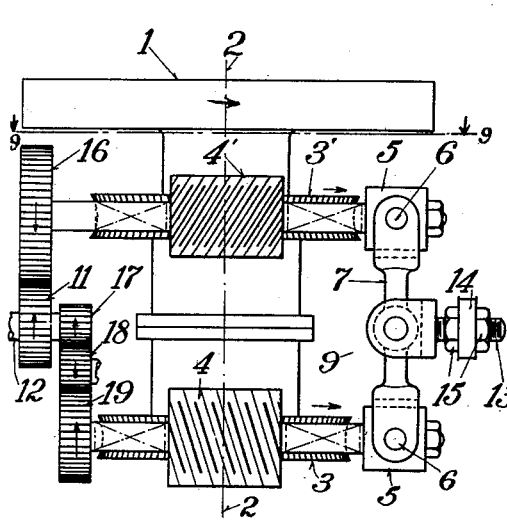
Fig. VII.
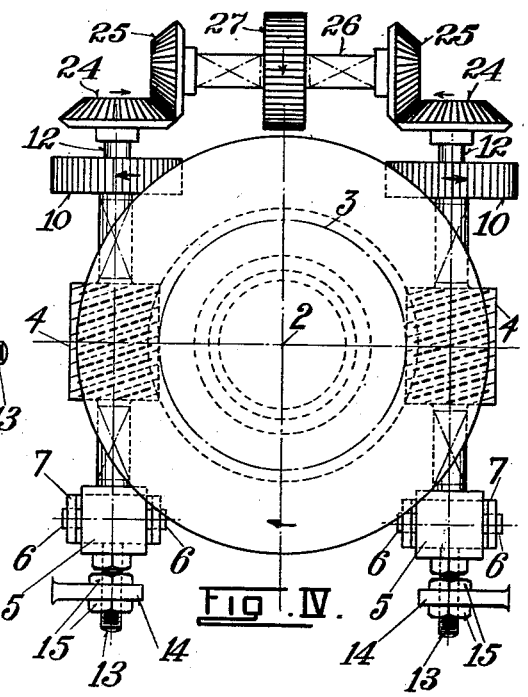
Fig. IV.
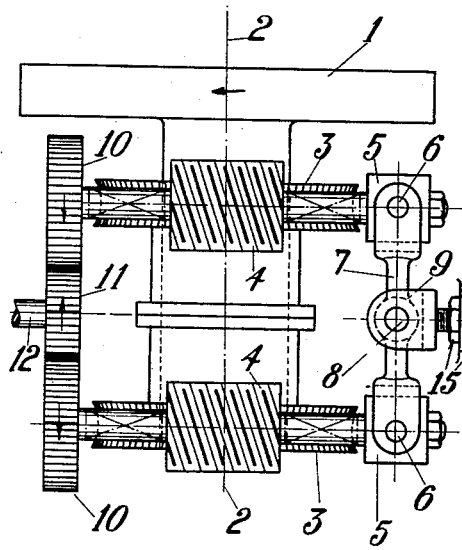
Fig. V.
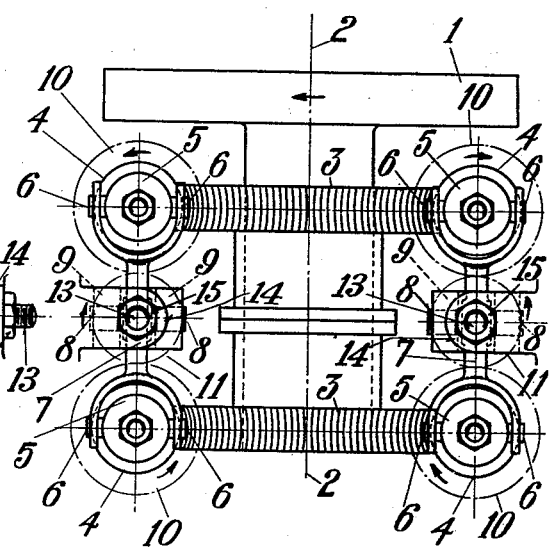
Fig. VI.

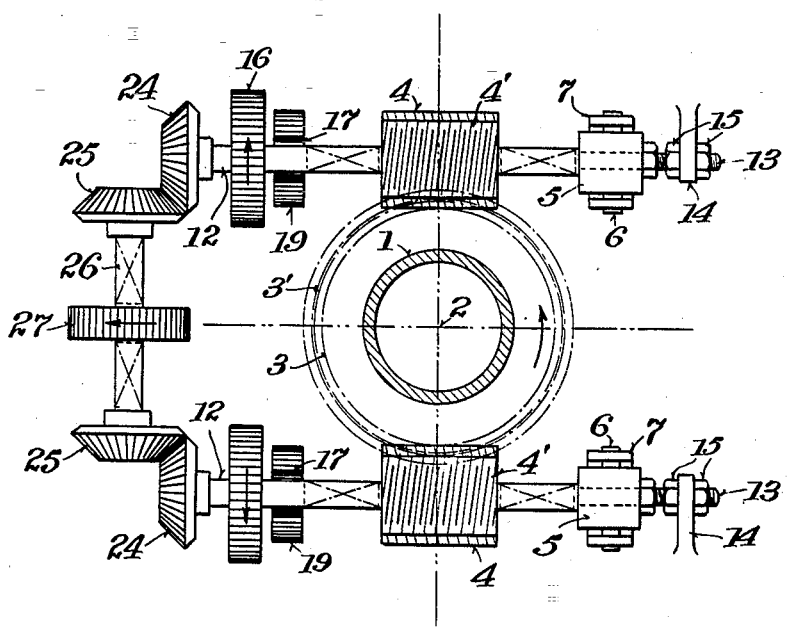

HERMAN W. FALK AND PERCY C. DAY, OF MILWAUKEE, WISCONSIN, ASSIGNORS TO THE FALK COMPANY, OF WAUWATOSA, WISCONSIN, A CORPORATION OF WISCONSIN.

ANGULAR SPACING AND FEEDING MECHANISM FOR DIVIDING-ENGINES AND MACHINE-TOOLS.

1,172,778.     Specification of Letters Patent.     Patented Feb. 22, 1916.

Application filed February 27, 1914. Serial No. 821,384.

*To all whom it may concern:*

Be it known that we, HERMAN W. FALK and PERCY C. DAY, a citizen of the United States and a subject of the Kingdom of Great Britain, respectively, residing at Milwaukee, in the county of Milwaukee and State of Wisconsin, have invented certain new and useful Improvements in Angular Spacing and Feeding Mechanism for Dividing-Engines and Machine-Tools, of which the following is a specification, reference being had to the accompanying drawing, forming a part thereof.

This invention relates to the dividing, spacing, indexing or angular feeding mechanism for dividing engines, gear cutting machines, milling machines and other machine tools.

The main objects of the invention are to eliminate as far as possible, errors in spacing, shape or form, incident to irregularities and imperfections in the angular spacing and feeding mechanism, and to vibration of machines of the class above mentioned, and generally to improve the construction and operation of machines of this class.

For convenience of illustration and explanation the invention is shown and will be described as embodied in the angular spacing and feeding mechanism of a gear cutting machine, although it is applicable with little or no modification to other machines where accuracy of angular division, spacing or movement is required.

In gear cutting machines for the production of spur, helical, spiral, bevel or worm gears, the usual method employed for obtaining the correct spacing of the teeth around the gears to be cut depends on the accuracy of a worm and worm wheel which control the circular movement of the blank gear to be cut.

In machines designed for cutting gears by the process known as "hobbing", the gear blank is caused to revolve continuously in unison with a spiral cutter or "hob". Such machines produce gear teeth by what is known as the generating process, and the shape of the tooth spaces is not the same as the shape of the cutting tool which produces them, but depends on the maintenance of correct relative motions of the cutting tool and the gear blank as well as on the shape of the cutting tool.

Other gear cutting processes which fall under the classification of generating processes depend on the maintenance of correct relative motions of the cutting tool and gear blank, as well as on the shape of the cutting tool. Gear cutting processes which do not fall under the classification of generating processes, depend on the shape of the cutter or of a guide which controls the movement of the cutter for producing the shape of individual teeth, but they also depend on the accuracy of a dividing worm and worm wheel for obtaining correct spacing of the teeth around the gears which are cut. The accuracy of the circular motion imparted to a gear blank mounted on the spindle or work table of a gear cutting machine, when said motion is controlled by a worm and worm wheel, depends on the accuracy of the worm and of the worm wheel.

No dividing worm and worm wheel of commerce is absolutely accurate in all dimensions, but all contain inaccuracies which cause certain inequalities of motion to be imparted to the gear blank. In those gear cutting processes which are known as generating processes, these inequalities of motion result in two distinct kinds of error in the gears which are cut. One kind of error which may be called the error of spacing, is due to the slight eccentricity of the pitch circle of the dividing wheel in relation to the axis about which it revolves. This eccentricity produces a periodic acceleration and retardation of the dividing worm wheel in relation to the motion of the worm which drives it, so that although the worm wheel makes exactly one revolution for a certain total angular movement of the worm, yet each revolution includes a periodic change from maximum to minimum velocity and back again and the two extremes usually occur when opposite sides of the worm wheel are engaged with the worm. This periodic acceleration and retardation of the worm wheel in each complete revolution produces corresponding cyclic irregularities in the spacing of the teeth around the gears which are cut, the amount of these irregularities being directly proportional to the ratio between the diameter of the gear and the diameter of the dividing wheel which controls the movement of the gear blank on the gear cutting machine. Another kind of error, which may be called the error of shape is due to irregularities of motion produced by inaccuracies in the form of the worm which drives the worm wheel, by variations in the pitch of the worm threads and by the action of the worm threads when entering and leaving their engagement with the dividing worm wheel. This error of shape is produced on the individual teeth of the gears which are cut and in some circumstances will result in the formation of ridges and hollows at definite points and intervals across the faces of the gears which are cut. It is the periodic recurrence of these errors of shape and of spacing which causes most of the noise in the operation of gears at high velocities, such as for example, the transmission of power from steam turbines through double helical or herringbone gears. Another contributory cause to noise and chatter in cut gearing, is the lack of smoothness produced by vibration of the gear blank and gear cutting machine during the cutting process.

The specific object of the invention as embodied in a gear cutting machine is to eliminate, as far as possible, the above mentioned errors of spacing and errors of shape or form, in cut gears.

In the accompanying drawing like characters designate the same parts in the several figures.

Figures I, II and III are views looking respectively in the direction of the axis of the work support and in directions perpendicular thereto and to each other, of a portion of a gear-cutting machine embodying the invention in one of its simplest forms; Figs. IV, V and VI are similar views of a modified or more complete embodiment of the invention; Figs. VII and VIII are views similar to Figs. V and VI respectively, of another modification or still more complete embodiment of the invention, designed to eliminate or materially reduce all the errors hereinbefore mentioned; and Fig. IX is a section on the line 9—9, Fig. VII.

In one of its simplest forms our invention as embodied in a gear cutting machine, consists in two driving worms which operate simultaneously in a particular manner hereinafter described, with two dividing worm wheels for producing the required circular motion of the spindle or work table of a gear-cutting machine.

Referring to Figs. I, II and III, a work table or support 1, supported in suitable bearings, is arranged to revolve about the axis 2—2. Two worm wheels 3, are attached to the work table 1 at a convenient distance apart. The two worm wheels 3 are driven by two worms 4, which are supported by shafts and journal bearings in the usual manner. Each worm shaft is provided with a pivoted thrust-bearing or collar 5, the two thrust-bearings or collars being fitted to adjacent ends of the worm shafts. The thrust-bearings 5 are not directly attached to the framework of the machine, but are connected by some suitable thrust transmitting and equalizing device such as a link or lever 7, which is pivotally attached to the thrust-bearings by the trunnions 6, or in any suitable manner. The link or lever 7 is provided with fulcrum pins 8, situated midway between the trunnions 6. These fulcrum pins 8 have bearings in a bracket 9, attached to the framework of the machine. It must be understood that the angular movements of the link or lever 7 about the fulcrum pins 8 are very small in comparison with the distance between the trunnions 6 and the fulcrum pins 8, so that in practice the motions of the trunnions 6 in the ends of the links are so nearly in straight lines that special provision for sliding movements is not necessary. The two worms are driven by gear wheels 10, which mesh with a gear 11 on a shaft 12, which is driven in the usual manner by the dividing change wheels of the machine. The two worm wheels 3 are preferably machined together at one operation and afterward cut with one setting on a worm gear cutting machine. When so made, the two wheels will have errors of spacing which lie in the same direction in both. After the worm wheel teeth have been cut, the wheels are separated and one of them is inverted or revolved relatively to the other, so that their points of maximum eccentricity will be approximately 180 degrees apart, in which relative positions they are secured to the work table or support. The two worms 4 are caused to revolve at uniform speeds by the shaft 12 and gear wheels 11 and 10. So long as the two worm wheels 3 revolve uniformly with the worms 4, the thrust of both worms will exert equal pressures on the thrust collar 5, which will balance each other about the pivots 6 of the link or lever 7, so that the resultant thrust will be carried to the frame work of the machine through the fulcrum pins 8 and bracket 9 without any movement of the link 7 or longitudinal displacement of the worms 3. But when one worm meshes with its worm wheel in a portion of its circumference of greater eccentricity than the eccentricity of that portion of the circumference of the other worm wheel which is engaged at the same time with its worm, then the one worm exerts a greater pressure on its thrust-collar than does the other worm, and the unbalanced pressures at the ends of link or lever 7 cause longitudinal displacement of the two worms in the direction of their axes but of opposite sense until equilibrium is restored. Since the maximum eccentricities of the two worm wheels are set approximately 180 degrees apart, it follows that every forward displacement of the teeth on one worm wheel coincides with an approximately equal and opposite or backward displacement of the teeth on the other worm wheel and equilibrium is obtained in all positions, so far as refers to the cylic errors of spacing in the teeth of the two worm wheels, by equal and opposite longitudinal translations of the two worms accompanied by corresponding rocking movements of the link or lever 7 about the fulcrum pins 8. The combined movements of rotation and translation of the two worms produce uniform rotation of the work table 1 about its axis 2—2, while the errors due to eccentricity of the two worm wheels about said axis are absorbed in opposite movements of the two worms which are translated bodily in the direction of their axes but in opposite sense, producing a cycle of rocking movements of the link or lever 7 about the fulcrum pins 8. This arrangement produces substantially accurate and uniform angular motion of the work table about its axis 2—2, notwithstanding that the two worm wheels 3 possess cylic irregularities.

Blank gears mounted and cut on a work table driven by the described arrangement are produced with far less error of spacing than when cut in the ordinary manner with a single dividing worm and worm wheel.

In a modification or more complete embodiment of our invention we provide two pairs of connected worms which operate on the two worm wheels in different positions.

Referring to Figs. IV, V and VI, the brackets 9, instead of being fixed to the framework of the machine, are provided with means for adjustment in either direction parallel with the worm shafts which are connected with said brackets by the links or equalizing levers 7. As shown, such adjusting means may consist of screws 13, formed or connected with the brackets 9, passing freely through lugs 14 on the machine frame or other support and secured in adjusted positions therein by nuts 15. Both pairs of worms are simultaneously rotated by any suitable mechanism such as bevel gears 24, mounted on the shafts 12 and meshing with bevel gears 25 on a transverse shaft 26 provided with a gear 27, which affords a single connection for driving all the worms. One pair of worms is adjusted so as to drive the worm wheels positively on the trailing side of the worm wheel teeth, the other pair is adjusted by moving the said brackets so that the worm threads bear against the leading side of the worm wheel teeth, so as to prevent lost motion or jerky movements of the work table. This arrangement serves to eliminate vibration and chatter in the gear-cutting machines and to prevent some of the inaccuracies which occur from these causes. The worms of each pair connected by a link or lever 7, may be made of opposite hand and rotated in opposite directions. They may also be made of different pitch, lead and diameter and with different numbers of threads, and the worm wheels with which they work may be of the same or different diameters. The two worms, if of different lead, can be revolved at different speeds from one shaft by using unequal gears. Such arrangements are used to eliminate the second class of errors hereinbefore described as errors of shape, and to break up the regular recurrence of these errors and distribute them between the teeth around the peripheries of the gears to be cut. Since these errors of shape are traceable to the action of individual worm threads on the teeth of the dividing worm wheels, it follows that if the worms are differently constructed and revolve at different speeds, the resultant errors will vary in form and will be distributed at irregular intervals.

Referring to Figs. VII, VIII and IX, the worms 4 and 4' of each connected pair are of opposite hand and different pitch, lead and diameter, and are rotated from the shaft 12 at different speeds and in opposite directions, one by the gear train 11 and 16 and the other by the gear train 17, 18 and 19. The worm wheels 3 and 3' are also of different pitch, lead and diameter. In other respects the gearing is substantially like that shown in Figs. IV, V and VI.

Errors of spacing resulting from eccentricity of the dividing worm wheel are caused mainly, if not wholly, by the angularity of the engaging faces of the worm and worm wheel teeth to the axis of the driving worm and the shifting of the point of contact between the teeth toward and from the axis of the worm, and not by variation of the distance between the axis of rotation and the point of contact between the teeth, the effect of which is negligible.

Various modifications other than those specifically shown and described, such as increasing the number of worms and worm wheels and connecting the worms by a system of links or equalizing levers or by other thrust transmitting devices, may be made without departing from the principle and scope of the invention as defined in the following claims.

We claim:

1. In angular spacing and feeding mechanism for dividing engines and machine tools, the combination of a rotary work support, two worm wheels attached to said support with their points of maximum eccentricity on opposite sides of its axis, worm shafts provided with axially movable thrust bearings and with worms meshing with the worm wheels, an equalizing lever pivotally connected with said thrust bearings and fulcrumed between said bearings to a support, and means for rotating said worm shafts.

2. In angular spacing and feeding mechanism for dividing engines and machine tools, the combination of a rotary work support provided with two worm wheels of different lead, two axially movable driving worms of different lead meshing respectively with said worm wheels, means for simultaneously rotating said worms, and a thrust transmitting and equalizing device connecting said worms.

3. In angular spacing and feeding mechanism for dividing engines and machine tools, the combination of a rotary work support, two worm wheels attached to said support, worm shafts provided with axially movable thrust bearings and with worms of different lead meshing respectively with said worm wheels, means for simultaneously rotating the worms, and an equalizing lever pivotally connected with said thrust bearings and fulcrumed between said bearings to a support.

4. In angular spacing and feeding mechanism for dividing engines and machine tools, the combination of a rotary work support provided with two worm wheels, two pairs of axially movable worms meshing with said worm wheels, means for simultaneously rotating said worms, and thrust transmitting and equalizing devices connecting in pairs the worms which mesh with different worm wheels.

5. In angular spacing and feeding mechanism for dividing engines and machine tools, the combination of a rotary work support, two worm wheels attached to said support, two pairs of worm shafts provided with axially movable thrust bearings and with worms meshing with said worm wheels, equalizing levers pivotally connected with said thrust bearings and fulcrumed between said bearings to supports one of which is adjustable in a direction parallel with the worm shafts connected therewith, each pair of lever connected worms meshing with different worm wheels and each pair of unconnected worms meshing with the same worm wheel, and means for simultaneously rotating said worms.

6. In angular spacing and feeding mechanism for dividing engines and machine tools, the combination of a rotary work support provided with two worm wheels having their corresponding irregularities angularly disposed the one to the other with relation to the axis of the support, axially movable worms meshing with said worm wheels, means for simultaneously rotating said worms, and a thrust transmitting and equalizing device connecting said worms.

7. In angular spacing and feeding mechanism for dividing engines and machine tools, the combination of a rotary work support, two worm wheels attached to said support with their corresponding irregularities disposed in different angular relations to the axis of said support, parallel shafts provided with axially movable thrust bearings and with worms meshing respectively with the worm wheels, an equalizing lever pivotally connected with said thrust bearings and fulcrumed between them to a support, and means for simultaneously rotating the worms.

8. In angular spacing and feeding mechanism for dividing engines and machine tools, the combination of a rotary work support provided with worm wheels of different lead having their corresponding irregularities disposed in different angular relations to its axis, axially movable worms of different lead meshing respectively with said worm wheels, means for simultaneously rotating said worms, and a thrust transmitting and equalizing device connecting said worms.

9. In angular spacing and feeding mechanism for dividing engines and machine tools, the combination of a rotary work support, two worm wheels attached to said work support with their corresponding irregularities disposed in different angular relations to the axis of said support, parallel shafts provided with axially movable thrust bearings and with worms of different lead meshing respectively with said worm wheels, an equalizing lever pivotally connected with said thrust bearings and fulcrumed between them to a support, and means for simultaneously rotating said worms.

10. In angular spacing and feeding mechanism for dividing engines and machine tools, the combination of a rotary work support provided with two approximately coaxial worm wheels having their corresponding irregularities disposed in different angular relations to its axis, two pairs of axially movable worms meshing with said worm wheels, means for simultaneously rotating said worms, and thrust transmitting and equalizing devices connecting in pairs the worms meshing with different worm wheels.

11. In angular spacing and feeding mechanism for dividing engines and machine tools, the combination of a rotary work support, two worm wheels attached to said support in approximate coaxial relation thereto and having their corresponding irregularities disposed in different angular relation to the axis of said support, two pairs of worm shafts provided with axially movable thrust bearings and with worms of different lead meshing with the worm wheels, equalizing levers pivotally connected with said thrust bearings and fulcrumed between said bearings to supports one of which is adjustable in a direction parallel with the worm shafts connected therewith, each pair of lever connected worms meshing with different worm wheels and each pair of unconnected worms meshing with the same worm wheel, and means for simultaneously revolving said worms.

12. In angular spacing and feeding mechanism for dividing engines and machine tools, the combination of a rotary work support provided with approximately coaxial worm wheels of different lead having their points of maximum eccentricity on opposite sides of its axis, axially movable worms of different lead meshing respectively with said worm wheels on the same side of said support, means for simultaneously rotating said worms, and a thrust transmitting and equalizing device connecting said worms.

13. In angular spacing and feeding mechanism for dividing engines and machine tools, the combination of a rotary work support, two worm wheels attached to said support with their points of maximum eccentricity on opposite sides of its axis, parallel worm shafts provided with axially movable thrust bearings and with worms of different lead meshing with said worm wheels, an equalizing lever pivotally connected with the thrust bearings and fulcrumed between them to a support, and means for rotating said worms simultaneously at different rates of speed.

14. In angular spacing and feeding mechanism for dividing engines and machine tools, the combination of a rotary work support provided with two approximately coaxial worm wheels of different hand having their points of greatest eccentricity on opposite sides of its axis, axially movable worms of different hand meshing respectively with said worm wheels on the same side thereof, means for simultaneously rotating said worms in opposite directions, and a thrust transmitting and equalizing device connecting said worms.

15. In angular spacing and feeding mechanism for dividing engines and machine tools, the combination of a rotary work support, two worm wheels attached to said support with their points of greatest eccentricity on opposite sides of its axis, parallel worm shafts provided with axially movable thrust bearings and with worms of different hand meshing with said worm wheels, an equalizing lever pivotally connected with the thrust bearings and fulcrumed between them to a support, and means for simultaneously rotating said worms in opposite directions.

16. In angular spacing and feeding mechanism for dividing engines and machine tools, the combination of a rotary work support provided with approximately coaxial worm wheels of different diameters having their points of greatest eccentricity on opposite sides of its axis, worms of different diameters meshing respectively with said worm wheels on the same side of said support, means for simultaneously rotating said worms, and a thrust transmitting and equalizing device connecting said worms.

17. In angular spacing and feeding mechanism for dividing engines and machine tools, the combination of a rotary work support, worm wheels of different diameters attached to said support with their points of greatest eccentricity on opposite sides of its axis, parallel worm shafts provided with axially movable thrust bearings and with worms of different diameters meshing with the worm wheels, an equalizing lever pivotally connected with the thrust bearings and fulcrumed to a support between them, and means for simultaneously rotating said worms.

18. In angular spacing and feeding mechanism for dividing engines and machine tools, the combination of a rotary work support, gearing for rotating said support comprising a pair of driving worms and a pair of trailing worms, means for simultaneously rotating said worms, and thrust transmitting and equalizing devices connecting the worms of the respective pairs.

19. In angular spacing and feeding mechanism for dividing engines and machine tools, the combination of a rotary work support, gearing for rotating said support comprising a pair of axially movable driving worms and a pair of axially movable trailing worms provided with axially movable thrust bearings, means for simultaneously rotating said worms, and lever connections between said thrust bearings adapted to transmit and equalize the end thrust thereon, one of said connections being adjustable in the direction of the axes of the worms connected thereby.

20. In angular spacing and feeding mechanism for dividing engines and machine tools, the combination of a rotary work support, gearing for rotating said support comprising a pair of worms of different diameters, means for simultaneously rotating said worms, and a thrust transmitting and equalizing connection between said worms.

21. In angular spacing and feeding mechanism for dividing engines and machine tools, the combination of a rotary work support, gearing for rotating said support comprising a pair of worms, means for simultaneously rotating said worms at different speeds, and a thrust transmitting and equalizing connection between said worms.

22. In angular spacing and feeding mechanism for dividing engines and machine tools, the combination of a rotary work support, gearing for rotating said support comprising a pair of axially movable worms of different diameters provided with axially movable thrust bearings, means for simultaneously rotating said worms, and a lever connection between said bearings adapted to transmit and equalize the end thrust thereon.

23. In angular spacing and feeding mechanism for dividing engines and machine tools, the combination of a rotary work support, gearing for rotating said support comprising a pair of axially movable worms provided with axially movable thrust bearings, means for simultaneously rotating said worms at different speeds, and a lever connection between said bearings adapted to transmit and equalize the end thrust thereon.

In witness whereof we hereto affix our signatures in presence of two witnesses.

HERMAN W. FALK.
    PERCY C. DAY.

Witnesses:
 CLARENCE R. FALK,
 CHARLES L. JONES.